(12) United States Patent
Wang et al.

(10) Patent No.: US 7,090,584 B2
(45) Date of Patent: Aug. 15, 2006

(54) HIGH TEMPERATURE SLIP SPLINE BOOT

(75) Inventors: Shen-Ling Allen Wang, Northville, MI (US); Lawrence R. Mischley, Lapeer, MI (US)

(73) Assignee: GKN Driveline North America, Inc., AuburnHills, MI (US)

( * ) Notice: Subject to any disclaimer, the term of this patent is extended or adjusted under 35 U.S.C. 154(b) by 148 days.

(21) Appl. No.: 10/827,853

(22) Filed: Apr. 19, 2004

(65) Prior Publication Data

US 2005/0233812 A1    Oct. 20, 2005

(51) Int. Cl.
    *F16D 3/84*    (2006.01)
(52) U.S. Cl. ....................... 464/175; 277/912
(58) Field of Classification Search ............... 464/173, 464/175; 277/636, 912; 138/121
    See application file for complete search history.

(56) References Cited

U.S. PATENT DOCUMENTS

| 4,730,834 A | * | 3/1988 | Ukai et al. ................. 277/636 |
| 5,176,390 A | * | 1/1993 | Lallement ................... 277/636 |
| 5,308,091 A | * | 5/1994 | Mihalcin .................... 277/636 |
| 5,628,688 A | * | 5/1997 | Eversole et al. ........ 464/175 X |
| 6,755,217 B1 | * | 6/2004 | Yoshida et al. ............. 138/121 |

* cited by examiner

*Primary Examiner*—Greg Binda
(74) *Attorney, Agent, or Firm*—Jennifer M. Brumbaugh; Mick A. Nylander

(57) ABSTRACT

A slip spline boot for use in a constant velocity joint of a vehicle drive line includes a plurality of bellows. The plurality of bellows are arranged between a first and second end of the slip spline boot. The plurality of bellows have a specific peak to peak distance and a specific bellow angle for each of the bellows. The symmetrical boot will have the exact same peak to peak distance and bellow angle for each of the plurality of bellows on the slip spline boot. The slip spline boot is made of a high temperature high stiffness thermoplastic elastomer.

20 Claims, 3 Drawing Sheets

HIGH TEMPERATURE SLIP SPLINE BOOT

BACKGROUND OF THE INVENTION

1. Field of the Invention

The present invention generally relates to a drive train for a motor vehicle, and more particularly relates to an improved high temperature slip spline boot for use on a prop shaft of a vehicle.

2. Description of Related Art

There are generally four main types of automotive drive line systems. More specifically, there is a full time front wheel drive system, a full time rear wheel drive system, a part time four wheel drive system and an all wheel drive system. Most commonly, the systems are distinguished by the delivery of power to different combinations of drive wheels, i.e., front drive wheels, rear drive wheels or some combination thereof. In addition to delivering power to a particular combination of drive wheels, both drive systems permit the respectively driven wheels to rotate at different speeds. For example, the outside wheels must rotate faster than the inside drive wheels and the front drive wheels must normally rotate faster than the rear drive wheels.

Drive line systems also include one or more constant velocity joints (CVJ). Such joints, which include by way of example and not limitation, a slip spline joint, a plunging tripod, a high speed fixed joint, along with any other known type are well known to those skilled in the art and are employed where a transmission of a constant velocity rotary motion is desired or acquired. A typical drive line system for a wheel rear or all wheel drive vehicle, for example, incorporates one or more constant velocity joints that connect a pair of front and rear propeller shafts (prop shafts) that transfer torque from a power take off unit to a rear drive line module or the like. Similarly the drive line system for a front wheel drive vehicle incorporates one or more constant velocity joints that transfer torque from a power take off unit to a rotary drive shaft.

These constant velocity joints are generally grease lubricated for life and sealed by a boot. The constant velocity joints are sealed in order to retain grease inside the joint keeping any contaminates and foreign matter, such as dirt and water, out of the joint. To achieve this protection, the constant velocity joint is usually enclosed at one end of the outer race by a sealing boot made of a rubber, thermoplastic, silicone, or other pliable material. The opposite end of the outer race is generally enclosed by either the opposite end of the boot, a dome or cap, or the internal geometry of the outer race of the constant velocity joint. The sealing and protection of the constant velocity joint is necessary because contamination of the joints may cause internal damage and destruction of the joint. Furthermore, once the inner chamber of the constant velocity joint is lubricated, it is generally lubricated for life.

During operation, the constant velocity joint creates internal pressure in the inner chamber of the joint. This is due to the joints high speed operation which create higher pressures and higher temperatures. These high speed high temperature environments may effect prior art boots stability thus reducing their effectiveness in protecting the joint they are sealing. Therefore, many prior art sealing boots generally have to be made of a higher stiffness material to operate properly in the high speed high temperature environment of the prop shafts. Many of the prior art high speed boots have reduced durability because the choice of stiffer materials create boots that were not capable of plunging, articulating and sealing properly in the extreme drive line conditions of a vehicle driveshaft. Also, the ingestion of any water or contaminates into a boot of a high speed high temperature joint via a distortion of the boot during operation or a rupture or tear of the boot, may impact that stability of the high temperature high speed boot and lead to contamination of the joint and thus reduce its durability and longevity. Such boot failures may even eventually result in a joint failure.

Therefore, there is a need in the art for an improved high speed high temperature boot for use with a constant velocity joint of a prop shaft in a vehicle.

Furthermore, there is the need in the art for a symmetrical boot design with precise length and angles to achieve an optimal boot for a high temperature high speed environment that will be stable in such an environment. There also is a need in the art for an improved split spline boot for use in the drive line of a vehicle.

SUMMARY OF THE INVENTION

One object of the present invention is to provide an improved slip spline joint.

Another object of the present invention is to provide an improved high temperature thermoplastic elastomer (TPE) boot for use with a slip spline.

Yet a further object of the present invention is to provide a symmetrical slip spline boot with equal peak to peak distance.

Still another object of the present invention is to provide a symmetrical slip spline boot that has a predetermined convolute angle to achieve optimal design for a TPE boot with high stiffness.

It is still a further object of the present invention to provide a slip spline boot that will stabilize the boot during high speed and high temperatures within the drive train environment.

It is still a further object of the present invention to provide a slip spline boot that is capable of plunging while still having a boot with a lower modulus and providing small displacement.

It is a further object of the present invention to provide a nine peak slip spline boot having a plunge capability of plus or minus twenty mm.

To achieve the foregoing objects a slip spline boot for use on a propeller shaft in a vehicle drive line is disclosed. The slip spline boot includes a first end and a second end. A plurality of bellows are arranged between the first and second end of the boot. The bellows have an equal peak to peak distance and have a bellow angle of approximately 50 to 55 degrees.

One advantage of the present invention is an improved slip spline joint in a drive line of an automotive vehicle.

A further advantage of the present invention is an improved slip spline boot for use in a vehicle drive line.

Still another advantage of the present invention is a symmetrical slip spline boot with equal peak to peak distance and predetermined convolute angles to achieve an optimal design.

Still another advantage of the present invention is a slip spline boot using a high temperature thermoplastic elastomer which has a high stiffness that is still capable of being stable during the high speed rotation and the high temperatures of the drive line system.

Still another advantage of the present invention is a slip spline boot having a peak to peak distance of approximately ten and one half (10.5) mm.

Still another advantage of the present invention is a slip spline boot having a convolute angle of approximately 53.8 degrees for each convolute or bellow.

Still another advantage of the present invention is a plunging spline boot that has a lower modulus and provides a small displacement.

Still another advantage of the present invention is a slip spline boot that uses a nine peak geometry and will have a plunge capability of approximately plus or minus 20 mm.

Other objects, features and advantages of the present invention will become apparent from the subsequent description and the appended claims, taken in conjunction with the accompanying drawings.

DESCRIPTION OF THE EMBODIMENT(S)

Figure 1:
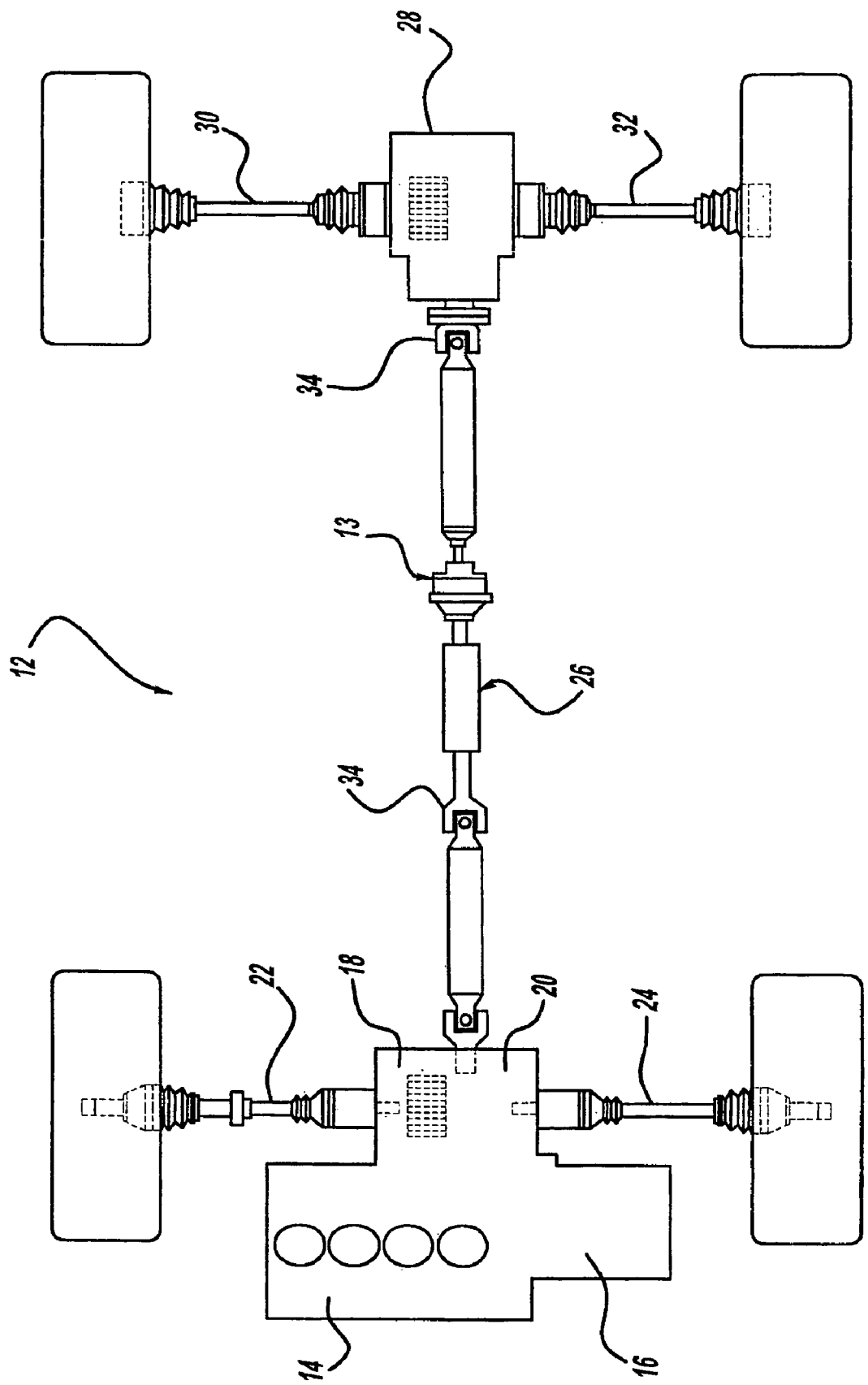
FIG. 1 shows a plan view for a vehicle drive line.

Referring to the drawings, a slip spline boot 40 according to the present invention is shown. It should be noted that the slip spline boot 40 is used on any type of constant velocity joint, such as the plunging tripod, a fixed tripod, a fixed high speed, a plunging joint, etc., may also be used according to the present invention. The present invention as shown is used on a slip spline joint 42 for use in a prop shaft of an automotive vehicle.

FIG. 1 shows a typical drive line 12 of an automotive vehicle. The drive line 12 shown in FIG. 1 is a typical all wheel drive vehicle, however it should be noted that a constant velocity joint using the boot of the current invention can also be used in a rear wheel drive vehicle, front wheel drive vehicle, all wheel drive or four wheel drive vehicle. The drive line 12 includes an engine 14 that is connected to a transmission 16 and a power take off unit 18. A front differential 20 is rotatably connected to the power take off unit 18. The front differential 20 has a right hand front half shaft 22 and a left hand front half shaft 24 each of which are connected to a wheel and deliver power to the wheels. On both ends of the right hand front half shaft 22 and the left hand front half shaft 24 are constant velocity joints. The propeller shaft 26 connects the front differential to the rear differential, wherein the rear differential includes a rear right hand half shaft 30 and a rear left hand half shaft 32, each of which ends with the wheel on one end thereof. A CV joint is located on both ends of the half shaft 32, 30 that connect to the wheel and rear differential 28. The propeller shaft 26, as shown in FIG. 1, is a three piece propeller shaft that includes a plurality of Carden joints and one high speed constant velocity joint 13. It should be noted that a slip spline joint may also be arranged on any of the three portions of the shown propeller shaft 26. The constant velocity joints transmit power to the wheels through the drive shaft, even if the wheels or the shaft are changing angles due to steering, raising or lowering of the suspension of the vehicle. Constant velocity joints may be any of the standard known types, such as plunging tripod, a cross groove joint, a fixed joint, a fixed tripod joint, double off set joint, slip spline joint, Carden joint, all of which are commonly known terms in the art for different varieties of constant velocity joints. Constant velocity joints allow for transmission of constant velocities which are encountered in everyday driving conditions of automotive vehicles on both half shafts and prop shafts of these vehicles.

Figure 2:
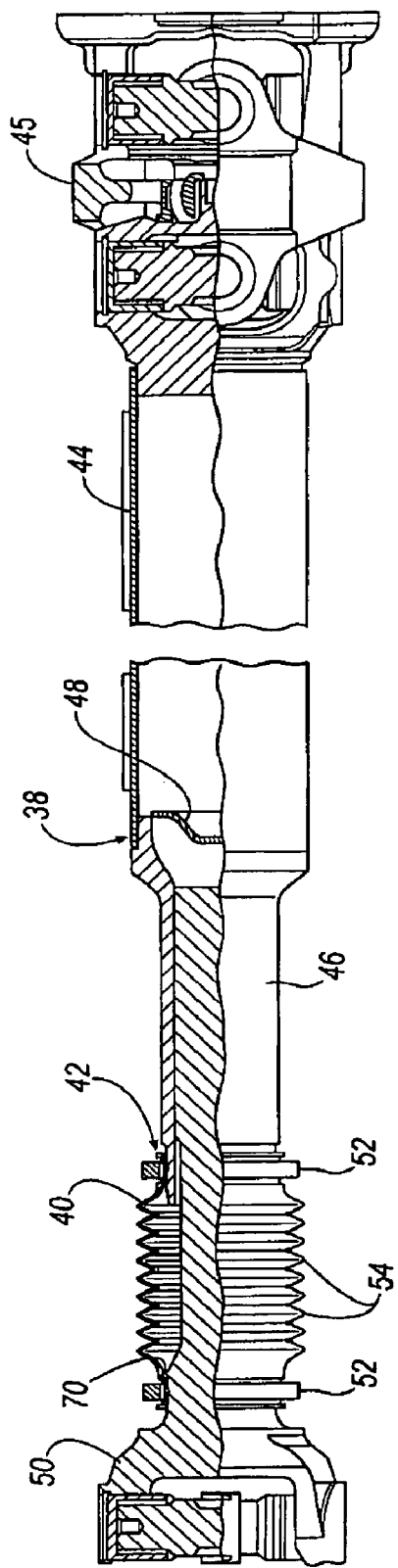
FIG. 2 shows a cross section of a prop shaft having a slip spline boot according to the present invention.
Figure 3:
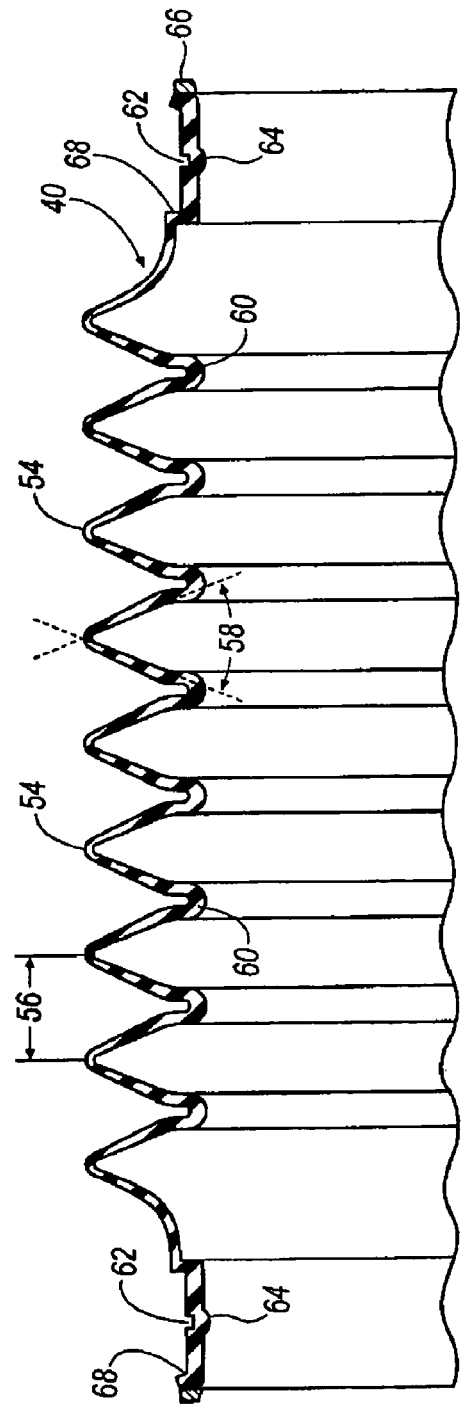
FIG. 3 shows a partial cross section of a slip spline boot according to the present invention.
Figure 5:
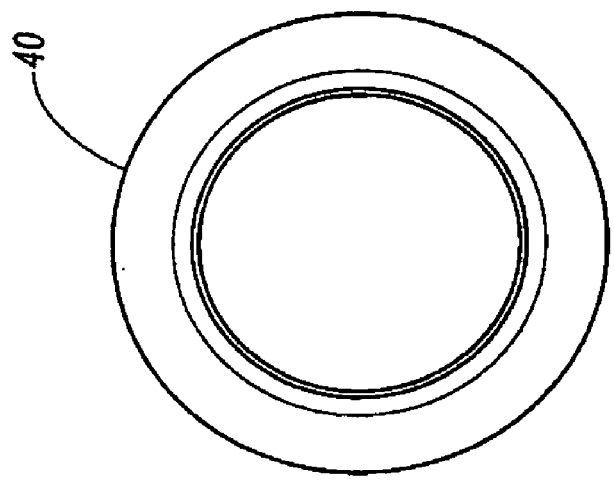
FIG. 5 shows an end view of a slip spline boot according to the present invention.
Figure 4:
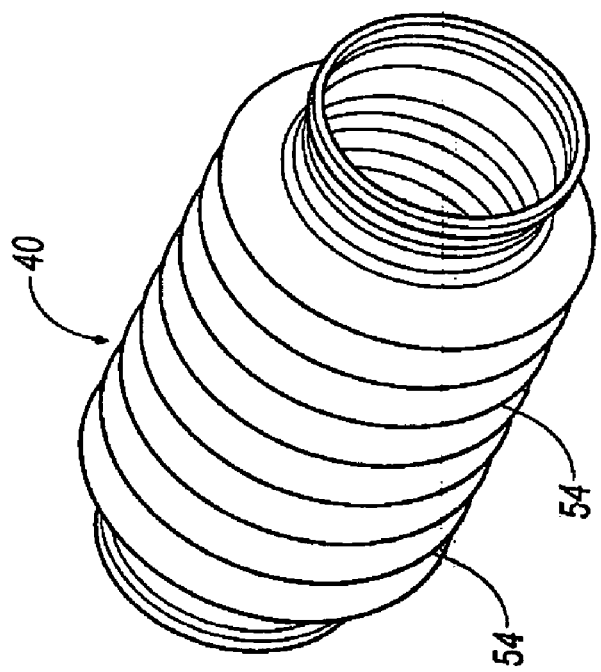
FIG. 4 shows a plan view of a slip spline boot according to the present invention.

FIG. 2 shows one embodiment of the present invention. A prop shaft 38 is shown for use in a vehicle drive line of any known type. The prop shaft 38 includes a tube 44 having a constant velocity joint 45 secured to one end thereof. The tube 38 may be secured to joint 45 by any known mechanical or chemical fastening means such as but not limited to welding, press fitting, etc. Any type of constant velocity joint or coupling may be used such as a Cardan joint, U-joint, or any of the known constant velocity joints may be used. Secured to an opposite end of the tube 44 of the prop shaft 38 is a splined muff 46. The splined muff 46 is welded, press fitted or connected by any known mechanical or chemical fastening means to the end of the tube 44. The splined muff 46 has a plurality of splines arranged on an inner surface of the inner diameter of the splined muff 46. A plug 48, in this embodiment a Welch plug, is arranged on one end of the spline muff 46 within the tube 44 of the prop shaft 38. A stub shaft of yoke shaft 50 is arranged within the muff spline 46 of the prop shaft 38. The yoke shaft 50 is connected on one end to a power take off unit, a transmission, a differential, or any other known constant velocity joint for transfer of constant velocity rotary motion. The yoke shaft 50 includes a plurality of splines on an outer surface on one end thereof. These splines will interact and interengage with the splines on the inside of the muff spline 46 to rotatably fix the yoke shaft 50 to the muff spline 46 and hence the tube 44 of the propeller shaft 38. The splined connection will allow for transfer of rotary motion through the prop shaft 38.

A slip spline boot 40 as shown in FIGS. 2 through 5, is arranged between the muff spline 46 and the yoke shaft 50. The slip spline boot 40 is made of a high temperature thermoplastic elastomer in this embodiment. However, it should be noted that any other elastomer, rubber, composite, fabric, etc., capable of withstanding the high temperatures and the high speeds of a prop shaft may also be used. The high temperature thermoplastic elastomer used has a high stiffness. The slip spline boot 40 also needs to accommodate a plunging operation over the slip spline joint thus a lower modulus and a small displacement is required of the boot 40. It should be noted that the slip spline 42 allows for axial movement relative between the muff spline 46 and the yoke shaft 50. This will allow the shaft 38 to absorb axial movements along the prop shaft 38 without buckling or bending of the prop shaft 38 in the drive line environment. The slip spline boot 40 is fastened to an outer surface of the muff spline 46 and an outer surface of the yoke shaft 50 by any known fastener 52. In the embodiment shown a circumferential clamp 52 is used to secure the first end and second end of the slip spline boot 40 to the muff spline 46 and yoke shaft 50. These clamps 52 will ensure that the boot 40 rotates at the same speed as the propeller shaft 38 during operation of the vehicle.

The slip spline boot 40 has a specific symmetrical geometry that will create an optimal boot design for the high temperature thermoplastic elastomer material thus allowing the slip spline boot 40 to plunge. The boot 40 will have a plunge capability of approximately plus or minus 20 mm. However, it should be noted that the plunge capability of the boot 40 can be designed to any known plunge range as small as five mm all the way up to 200 mm. In the embodiment shown the slip spline boot 40 includes a plurality of bellows or convolutes 54 arranged between the first and second end of the boot 40. The plurality of bellows 54 will have an equal peak to peak distance 56. In one embodiment shown the peak to peak distance 56 will be approximately 10.5 mm, however it should be noted that any other peak to peak distance may be used depending on the design requirements and the drive line requirements of the prop shaft 38 in the automotive vehicle. The symmetrical boot design will have the 10.5 mm peak to peak distance between adjacent bellows or convolutes 54. In the preferred embodiment of the slip spline boot 40 shown the boot 40 will have a total of nine bellows 54 or nine peaks for the boot 40. This will approximately give a working length for the boot 40 of approximately 97.5 mm. However, it should be noted that any number of peaks and length of boot may be used depending on the design environment and requirements of the drive line system. Each of the bellows or convolutes 54 will have a specific bellow or convolute angle 58 within the approximate range of 25 degrees to 75 degrees. In the preferred embodiment shown the bellow angle 58 of each bellow or convolute 54 will be approximately 53.8 degrees. The 10.5 mm peak to peak distance 56 and 53.8 degree convolute angle 58 will create a symmetrical boot design that will offer the slip spline boot 40 stability at high speeds and high temperatures typically found in the drive line prop shaft environment. Generally, the boot 40 will be stable at or above 4500 RPM's and at or above 150 degrees C. all of which are encountered in a high temperature high speed environment of the propshaft 38. This will allow the boot 40 to have a stable geometry during the high speeds and high temperatures thus allowing the boot 40 to provide proper sealing capabilities for the slip spline joint 42 within the prop shaft 38 of the drive line of the vehicle. The boot 40 also will reduce the boot modulus thus preventing premature failure due to high stress and strain of the thermoplastic elastomer material on the boot 40 in the high temperature high speed environment.

The slip spline boot 40 also has each of the bellows or convolutes 54 connected to one another at a bottom portion thereof by a U-shaped connector 60. Therefore, in the preferred embodiment shown in the drawings, there will be eight U-shaped connectors 60 connecting the nine bellows 54 to one another. Each end of the slip spline boot 40 according to the present invention will include a circumferential groove 62 on an outside surface thereof. Each end will also include a circumferential ridge 64 located on an inside surface of the slip spline boot 40 radially aligned with the circumferential groove 62 on the outside surface. In the embodiment shown in FIG. 3 an end ring 66 may also be fastened to each end of the slip spline boot 40, however this ring may also not be used on any of the embodiments contemplated including the preferred embodiment. Each end of the slip spline boot 40 also includes a channel 68 to assist in aligning the boot clamps 52 for securing the slip spline boot 40 to the muff spline 46 and the yoke shaft 50.

In operation the propeller shaft 38 will be installed with the muff spline 46 being secured to the tube 44 and the yoke shaft 50 being inserted and arranged in an interconnecting arrangement via splines to the muff spline 46. Then the slip spline boot 40 will be secured to an outer surface of the muff spline 46 near one end thereof, and an outer surface of the yoke shaft 50 at a predetermined position. It should be noted that both the muff spline 46 and the yoke shaft 50 may have an installation shoulder or lip 70 that may contact an inside surface of the slip spline boot 40. The fasteners 52, in our embodiment clamps, are then tightened to ensure the boot 40 will be rotatably fixed with respect to the propeller shaft 38 in the drive line environment. The boot 40 then will be capable of, in the embodiment shown, a plus or minus 20 mm plunge or movement in an axial direction to correspond with any adjustments of the yoke shaft 50 with respect to the muff spline 46 for the propshaft 38 in the automotive vehicle drive line during operation of the vehicle. Therefore, the slip spline boot 40 will in an accordion like manner either compress or be released depending on the axial forces acting on the propshaft 38 during operation of the vehicle drive line. The boot 40 being made of a high stiffness thermoplastic elastomer will allow for increased durability and longevity of the slip spline joint 42 without contamination from external contaminants, water or the like. The high stiffness boot 40 will allow, during the high temperature high speed operations, for the stability of the boot to remain intact thus creating increased sealability for the slip spline joint 42 compared to that of prior art boot and seal designs. It should be noted that the slip spline boot 40 may be used on any type of constant velocity joint but in the embodiment shown it is used to seal a slip spline joint 42.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A boot for use on a propeller shaft in a vehicle drive line including:
   a first end and a second end; and
   a plurality of bellows arranged between said first and second ends, said bellows having an equal peak to peak distance,
   wherein said bellows having a convolute angle of approximately 25 to 75 degrees, and
   wherein each of said bellows have a V-shaped peak and are connected to one another by a U-shaped connector.

2. The boot of claim 1 wherein the boot is made of a thermoplastic material capable of operating in temperatures above approximately 150 degrees Celsius.

3. The boot of claim 1 wherein said convolute angle is approximately 53.8 degrees.

4. The boot of claim 1 wherein the boot has a total of nine peaks.

5. The boot of claim 1 wherein said peak to peak distance is approximately 10.5 mm.

6. The boot of claim 1 wherein the boot is capable of operating at approximately 4500 rpm.

7. The boot of claim 1 wherein said bellows provide a plunge capability of approximately plus or minus 20 mm.

8. The boot of claim 1 wherein each end has a circumferential groove on an outside surface and a circumferential ridge on an inside surface.

9. A propeller shaft for use in an automotive driveline, said shaft including:
   a tube;
   a joint connected to said tube;
   a splined muff connected to an end of said tube;
   a yoke shaft arranged within said splined muff; and
   a boot arranged between said splined muff and said yoke shaft, said boot having a plurality of bellows with a substantially equal peak to peak distance between each of said bellows, said bellows having a bellow angle of approximately 25 to 75 degrees, wherein each of said bellows have a V-shaped peak and are connected to one another by a U-shaned connector.

10. The shaft of claim 9 wherein said boot has a first and second end.

11. The shaft of claim 10 wherein said ends each have a circumferential groove therein and a circumferential ridge on an inside surface.

12. The shaft of claim 11 further including a plurality of clamps to secure said boot to said splined muff and said yoke shaft.

13. The shaft of claim 9 wherein said boot is made of a thermoplastic elastomer.

14. The shaft of claim 9 wherein said bellow angle is approximately 53.8 degrees.

15. The shaft of claim 9 wherein said boot has nine peaks.

16. The shaft of claim 9 wherein said distance is approximately 10.5 mm.

17. The shaft of claim 9 wherein said boot has a plunge capability of approximately plus or minus 20 mm.

18. The shaft of claim 9 wherein said boot is capable of operating at temperatures above 150 degrees C. and at approximately 3,000 to 5,000 rpm.

19. A boot for use on a propeller shaft in a vehicle drive line, comprising:

a first end and a second end; and a plurality of bellows arranged between said first and second ends, said bellows made of a thermoplastic material capable of operating at temperatures above approximately 150 degrees Celsius, wherein said bellows having a convolute angle of approximately 25 to 75 degrees, and wherein each of said bellows have a V-shaped peak; and wherein each of said bellows is connected to one another at a bottom portion by a U-shaped connector and the U-shaped connector has an inner surface and an outer surface such that each of said inner and outer surfaces is U-shaped.

20. The boot of claim 19 wherein said bellows have an equal peak to peak distance.

* * * * *